United States Patent [19]

Rowan et al.

[11] Patent Number: 5,722,513
[45] Date of Patent: Mar. 3, 1998

[54] SCISSOR LIFT

[75] Inventors: Richard T. Rowan, Guelph; Leonard G. Sutherland, Brampton; Gary Cooke, Dundas; Paul A. Pedersen, Guelph, all of Canada

[73] Assignee: Pentalift Equipment Corporation, Guelph, Canada

[21] Appl. No.: 492,602

[22] Filed: Jun. 20, 1995

[51] Int. Cl.⁶ .................................................. B66B 9/02
[52] U.S. Cl. .................................... 187/269; 187/211
[58] Field of Search .......................... 182/269, 211, 182/210; 312/71; 108/136; 254/89 R, 90

[56] References Cited

U.S. PATENT DOCUMENTS

| | | | |
|---|---|---|---|
| 1,212,341 | 1/1917 | Fowler | 414/792.1 |
| 2,806,607 | 9/1957 | Korngold et al. | 211/49 |
| 2,980,287 | 4/1961 | Fisher | 220/93 |
| 3,080,066 | 3/1963 | Berridge et al. | 211/49 |
| 3,091,503 | 5/1963 | Fisher | 220/93 |
| 3,123,023 | 3/1964 | Bronson | 108/136 |
| 3,123,024 | 3/1964 | Bronson | 108/136 |
| 3,123,829 | 3/1964 | Bronson | 108/136 |
| 3,154,029 | 10/1964 | Bronson | 108/136 |
| 3,283,731 | 11/1966 | Maslow | 108/136 |
| 3,370,556 | 2/1968 | Kooi | 108/136 |
| 3,381,634 | 5/1968 | Rothschild | 108/136 |
| 3,402,923 | 9/1968 | Rhoads et al. | 267/61 |
| 3,444,830 | 5/1969 | Doetsch | 108/136 |
| 3,511,548 | 5/1970 | McIlhone | 312/71 |
| 3,606,021 | 9/1971 | Roels | 211/49 |
| 3,635,173 | 1/1972 | Ruben | 108/136 |
| 3,659,913 | 5/1972 | Waldron et al. | 312/71 |
| 3,663,078 | 5/1972 | Moore et al. | 312/71 |
| 3,694,044 | 9/1972 | Cummings | 312/71 |
| 3,738,722 | 6/1973 | Kooiman | 312/71 |
| 3,741,512 | 6/1973 | Olsson | 248/399 |
| 3,805,712 | 4/1974 | Taylor et al. | 108/136 |
| 3,853,075 | 12/1974 | Burch | 108/136 |
| 3,863,576 | 2/1975 | Olsson | 108/136 |
| 3,941,440 | 3/1976 | Menzin et al. | 312/71 |
| 4,007,925 | 2/1977 | DeRyke et al. | 271/160 |
| 4,070,072 | 1/1978 | Skaller | 312/71 |
| 4,149,762 | 4/1979 | Olsson et al. | 312/71 |
| 4,247,068 | 1/1981 | Edelson et al. | 248/162.1 |
| 4,351,245 | 9/1982 | Laporte | 108/136 |
| 4,449,760 | 5/1984 | House | 312/42 |
| 4,477,045 | 10/1984 | Karasawa et al. | 248/1 |
| 4,511,115 | 4/1985 | Ludwigsen | 248/562 |
| 4,558,648 | 12/1985 | Franklin et al. | 108/147 |
| 4,559,879 | 12/1985 | Hausser | 108/136 |
| 4,629,072 | 12/1986 | Loew | 211/59.3 |
| 4,768,762 | 9/1988 | Lund | 267/172 |
| 4,883,249 | 11/1989 | Garland | 248/561 |
| 4,949,540 | 8/1990 | Wich | 60/387 |
| 5,299,906 | 4/1994 | Stone | 414/792.3 |

*Primary Examiner*—Kenneth Noland
*Attorney, Agent, or Firm*—John R. S. Orange

[57] ABSTRACT

A scissor lift has a pair of leg assemblies pivotally connected to a base. Relative movement between the legs and the base is opposed by spring assemblies that may be selectively connected to a carriage to vary the bias on the legs. A cam member secured to the leg acts on the carriage to modify the motion between the leg and the carriage to maintain a uniform vertical spring rate.

29 Claims, 11 Drawing Sheets

5,722,513

SCISSOR LIFT

The present invention relates to lifts for supporting a load at an elevated location.

It is frequently necessary to transfer a load between locations such as, for example, between the end of a conveyor line and a pallet or vice versa. It is more convenient if the load is transferred through essentially a horizontal plane rather than having to be lifted or lowered from one location to another, and as such a number of lifting devices have been proposed that maintain a load in an elevated condition.

Some of these devices utilize a power actuator to elevate a load to a predetermined height and are useful where a single item has to be transferred from one location to another. However, where the load consists of multiple items, such as a pallet stacked with boxes or the like, then the power actuated lifts require readjustment after each layer of articles has been transferred.

To overcome that problem, it has previously been proposed to utilize a spring-loaded lift that seeks to counterbalance the load with a spring force. In this way, as articles are removed or added to a pallet, the vertical position of the pallet is adjusted so that the load is transferred at a constant height. This avoids the need for constant readjustment of the height of the lift and therefore allows for timely productive transfer of the load.

Prior devices such as that shown in U.S. Pat. No. 4,764,075 have utilized coil springs to provide a counterbalance for the load to be applied. The springs can be changed to allow the unit to be adjusted for different weight and height requirements. However, the changing of springs is a relatively complicated procedure and of course it is necessary to have replacement springs available at the location in which the lift is to be used.

In the prior proposal, the spring is orientated vertically and extends between a support and a base. Scissor legs interconnect the base and the support but the load is transferred through the spring. The legs merely serve to maintain an orientation between the support and the base. With this arrangement, the breakage of a spring may result in a rapid decrease in the height of the support and may have catastrophic effects. Moreover, the vertical orientation of the springs extending between the base and the support encumbers the area beneath the support which in turn may introduce a hazard in typical working environments and prone to damage any loading.

It is therefore an object of the present invention to provide a lift in which the above disadvantages are obviated or mitigated.

In general terms, the present invention provides a lift to maintain a load at an elevated location. The lift has a base and a support to support the load with a leg assembly interconnecting the support and the base. The leg assembly includes a pair of legs pivoted to one another intermediate their ends so as to permit relative movement between the support and the base while maintaining a predetermined orientation of the support relative to the base. Resilient biasing means act upon the leg to oppose relative movement between the leg and the base. The biasing means includes a plurality of biasing units that are selectively engageable with the leg to vary the bias acting on the leg. In this manner, the bias may be adjusted to suit the particular load without replacement of individual units.

In a further aspect, the biasing means is disposed generally normal to the direction of movement between the base and the support with load transfer means to act between the leg assembly and the biasing means. In a preferred embodiment, the biasing means is disposed adjacent the base thereby leaving the underside of the support unencumbered.

In a still further aspect, the invention provides a motion modifying mechanism that modifies the effect of relative movement between the leg and the base upon the biasing means.

An embodiment of the present invention will now be described by way of example only, with reference to the accompanying drawings, in which FIG. 1 is a side view of a scissor lift;

Figure 1:
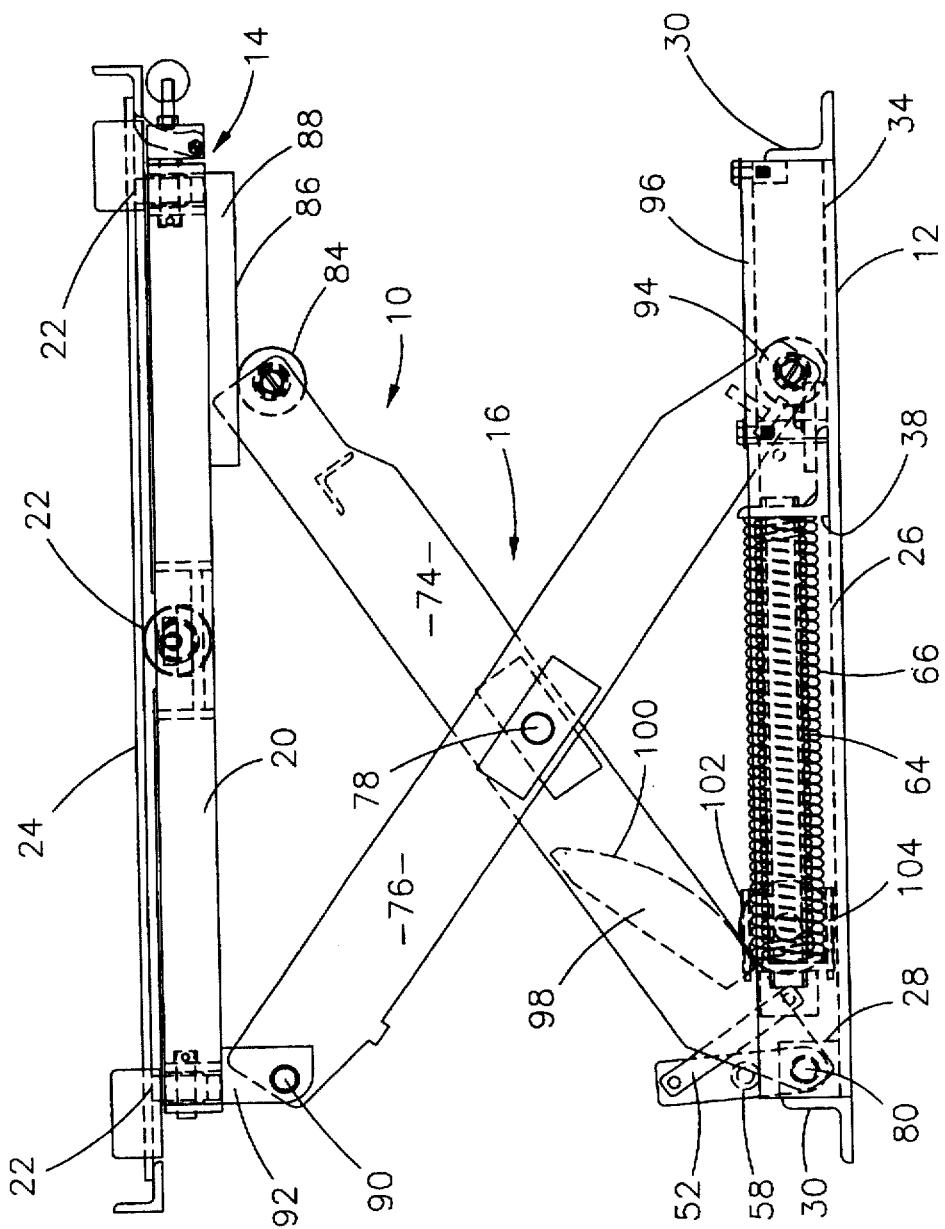
Figure 2:
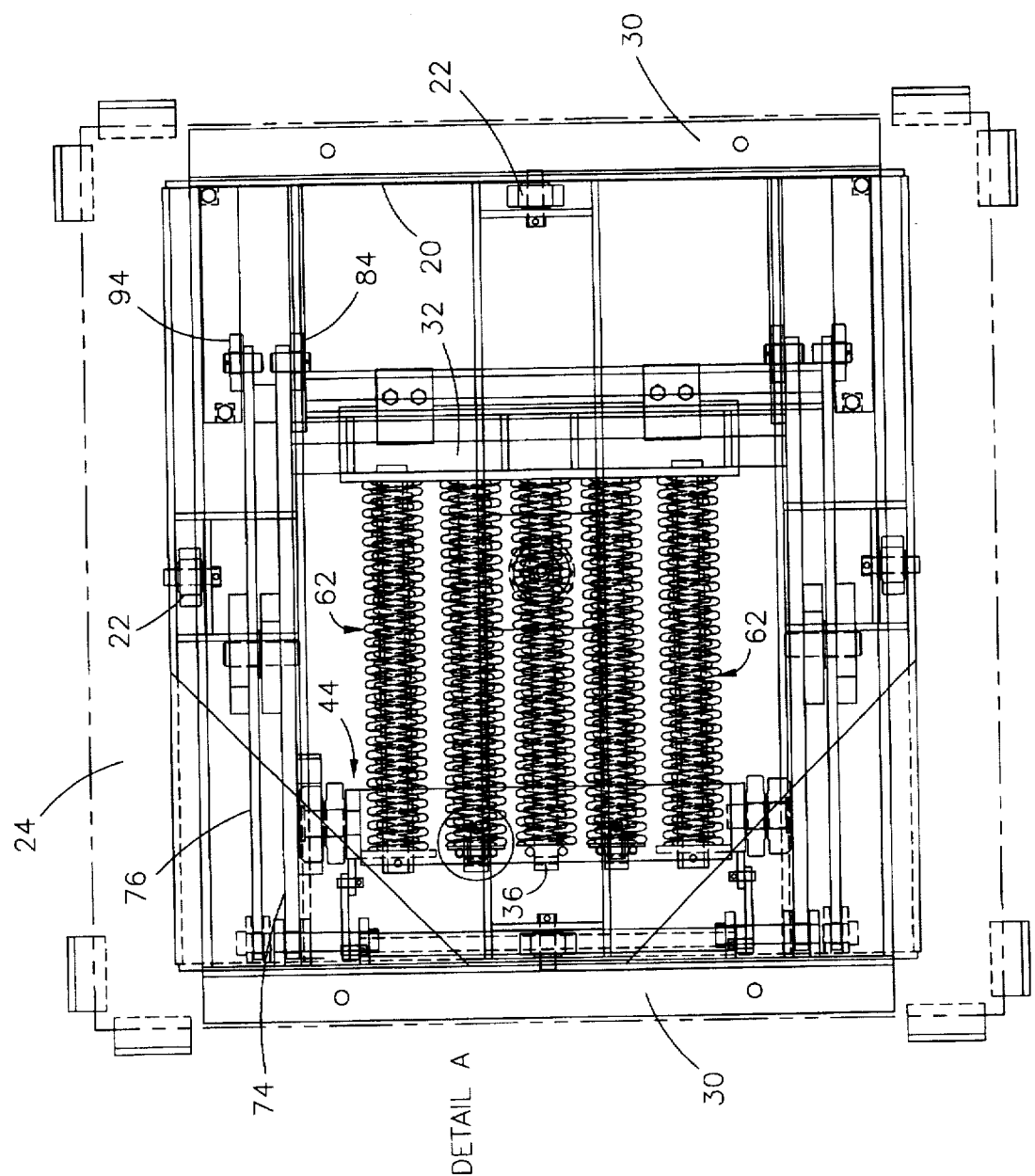
FIG. 2 is a plan view of the scissor lift of FIG. 1 having portions thereof removed for clarity.
Figure 3:
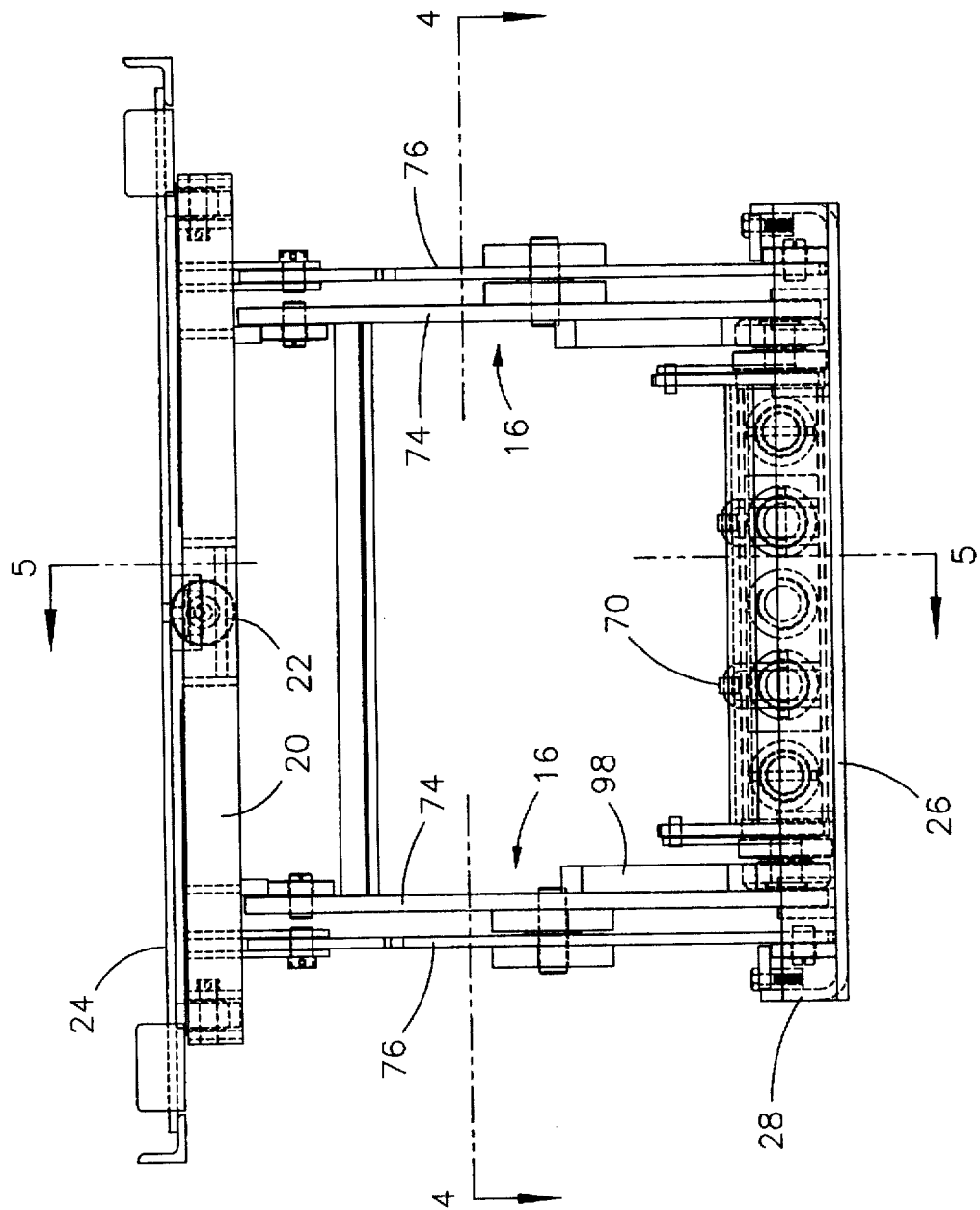
FIG. 3 is an end view of the lift shown in FIG. 1.

Referring therefore to FIG. 1, a lift 10 includes a base 12 and a support 14. A pair of leg assemblies each generally indicated 16 interconnects the base 12 and support 14 to maintain a predetermined relationship between the two.

The support 14 includes a fixed frame 20 that is generally square in plan and has rollers 22 disposed at the mid-point of each side of the frame 20. A platen 24 is supported on the rollers 22 for rotation about a vertical axis to allow rotation of a load supported on the platen 24.

The base 12 includes a plate 26 with upturned sides 28. Angle frame members 30 extend between the upturned sides 28 at opposite ends of the plate 26 to provide a peripheral frame for the base 12.

Figure 4:
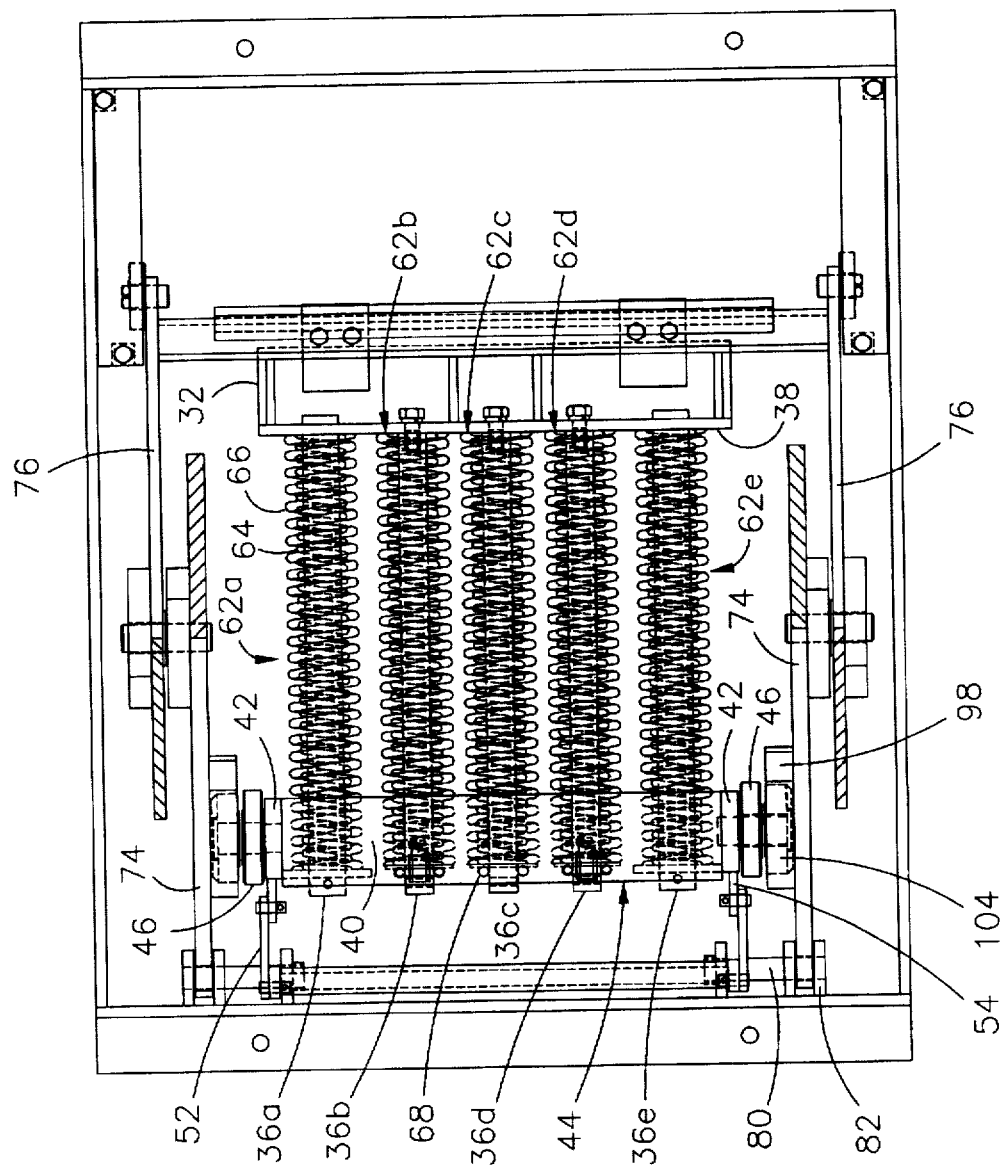
FIG. 4 is a view on the line 4—4 of FIG. 3.
Figure 5:
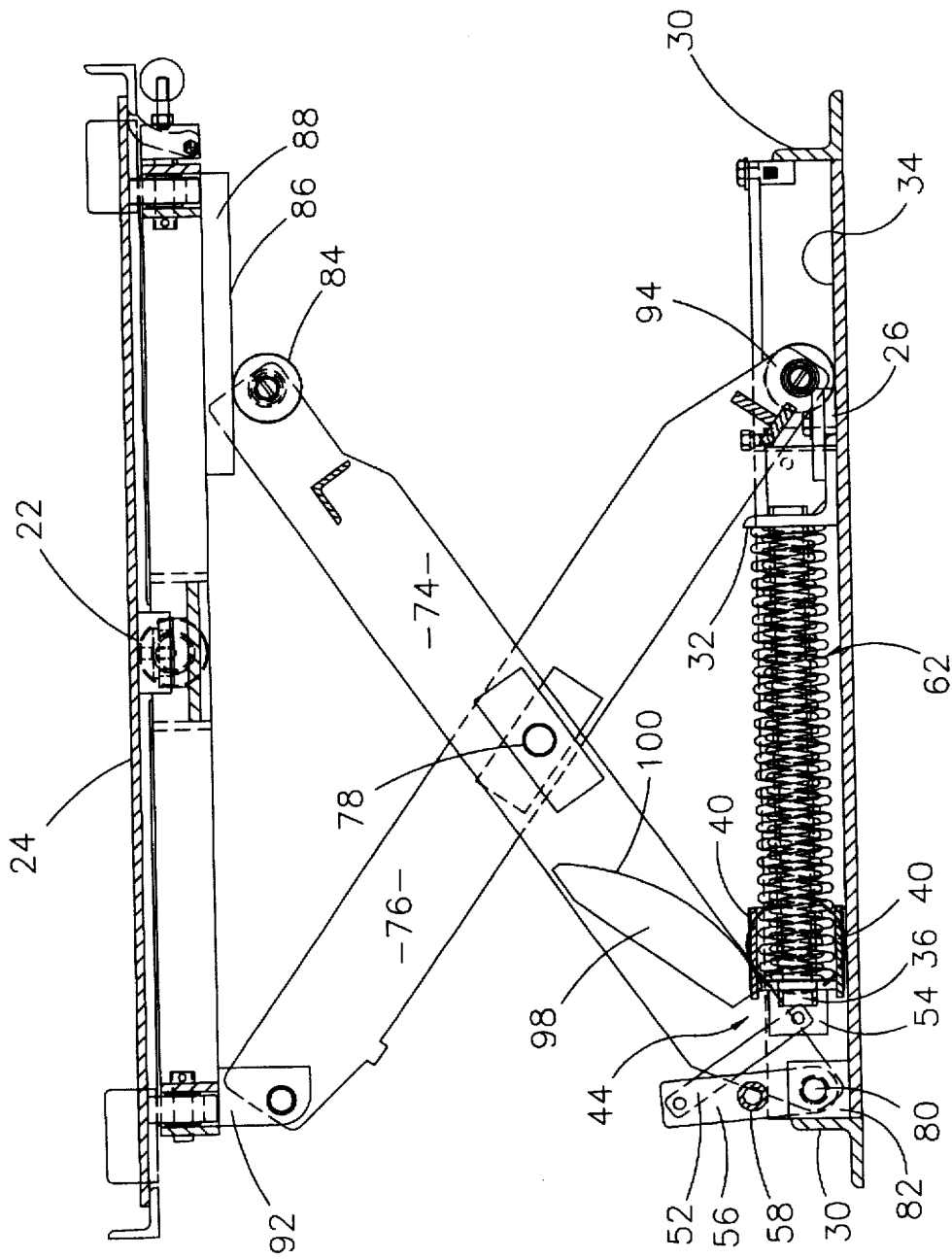
FIG. 5 is a view on the line 5—5 of FIG. 4.

As best seen in FIGS. 4 and 5, a bracket 32 formed from an angle member is secured to the upper surface 34 of the plate 26 parallel to the end member 30. Five guide rods 36 project horizontally from the vertical leg 38 of the bracket 32 so as to be parallel to but spaced from the upper surface 34.

The guide rods 36 pass between a pair of plates 40 that are interconnected by end plates 42 to define a carriage 44. The carriage 44 is supported at opposite ends by a roller 46 that can roll along the upper surface 34. The outermost rods 36a,36e are received in holes 48 in spacers 50 that extend between the plates 40 so that the carriage 44 is guided by the rods 36a,36e for movement along the longitudinal axis of the base 12. Tie rods 52 extend from a lug 54 provided on the carriage 44 to an arm 56 secured to opposite ends of a bar 58. The arms 56 are rotatably mounted in brackets 60 secured to the end members 30 and the bar 58 serves to maintain the carriage 44 aligned generally normal to the longitudinal axis as it moves along the rods 36.

Figure 10:
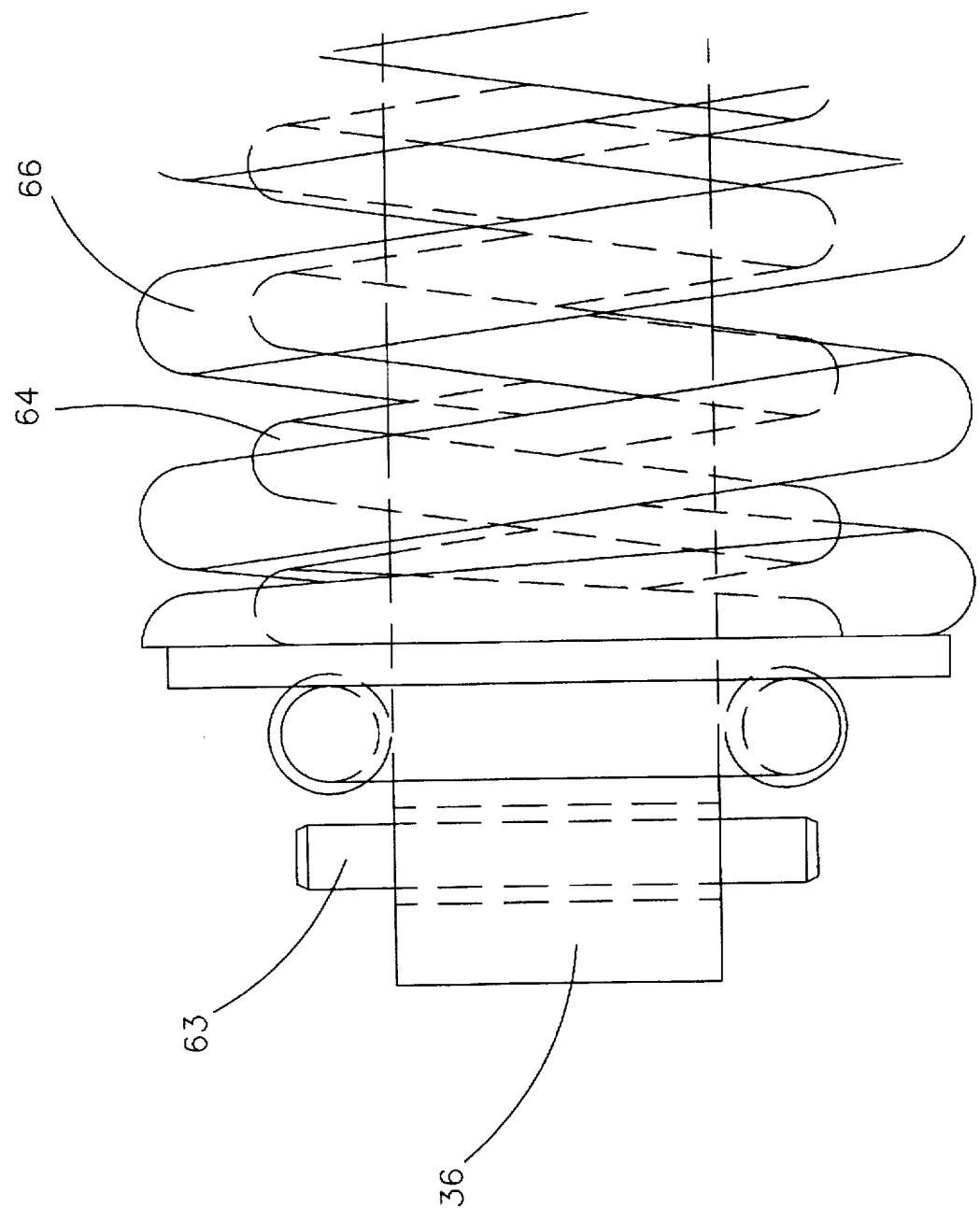
FIG. 10 is a view on the line 10—10 of FIG. 9.

Each of the rods 36 carries a spring assembly 62. Each spring assembly 62 includes inner and outer coil springs 64,66 respectively as shown in FIG. 10 which abut against the vertical face 38 of the bracket 32. The free length of the spring assembly 62 is less than that of the rods 36. With the support 14 in the elevated position as shown in FIG. 1, the inner spring assemblies 62b,62c,62d are unstressed but retained on the rods 36 by retaining pins 63 and the outer spring assemblies 62a,62e are stressed to balance the unloaded support 14.

The outer spring assemblies 62a,62e associated with the rods 36a,36e engage the spacer 50 and accordingly are permanently positioned to oppose movement of the carriage 44 to the bracket 32. The spring assemblies associated with the intermediate rods 36b, c and d are selectively connectible to the carriage 44 to vary the spring bias imposed on the carriage 44 as it moves towards the bracket 42.

The plates 40 are provided with pairs of holes 68 to either side of a rod 46. Each pair of holes 68 receives a fork 70 that has a pair of spaced legs 72 that pass to either side of the rod 36 to engage the end of the coil spring 64,66. With the forks 70 located in the holes 68, relative movement between the carriage 44 and the rods 36 causes compression of the coil springs but with the forks 70 removed, the coil springs pass between the plates 40 and do not oppose movement of the carriage 44.

Movement of the carriage 44 is induced by relative movement between the support 14 and the base 12. Each of the leg assemblies 16 includes a pair of legs 74,76 pivotally connected at their midpoint by a pin 78. The lower end of the leg 74 is pivotally connected by a pin 80 to lugs 82 secured to the end members 30. The opposite end of the leg 74 carries a roller 84 which engages a downwardly directed surface 86 of a track 88 provided on the support 14.

In a similar manner, upper end of the leg 76 is connected through a pin 90 to a bracket 92 on the support 14 that is spaced from the track 88. The opposite end of the leg 76 carries a roller 94 which rolls between the upper surface 34 of the base 12 and the underside of a cover plate 96 that is secured to the base 12 adjacent the upturned sides 28 to inhibit movement of the roller 94 away from the surface 34.

Figure 11:
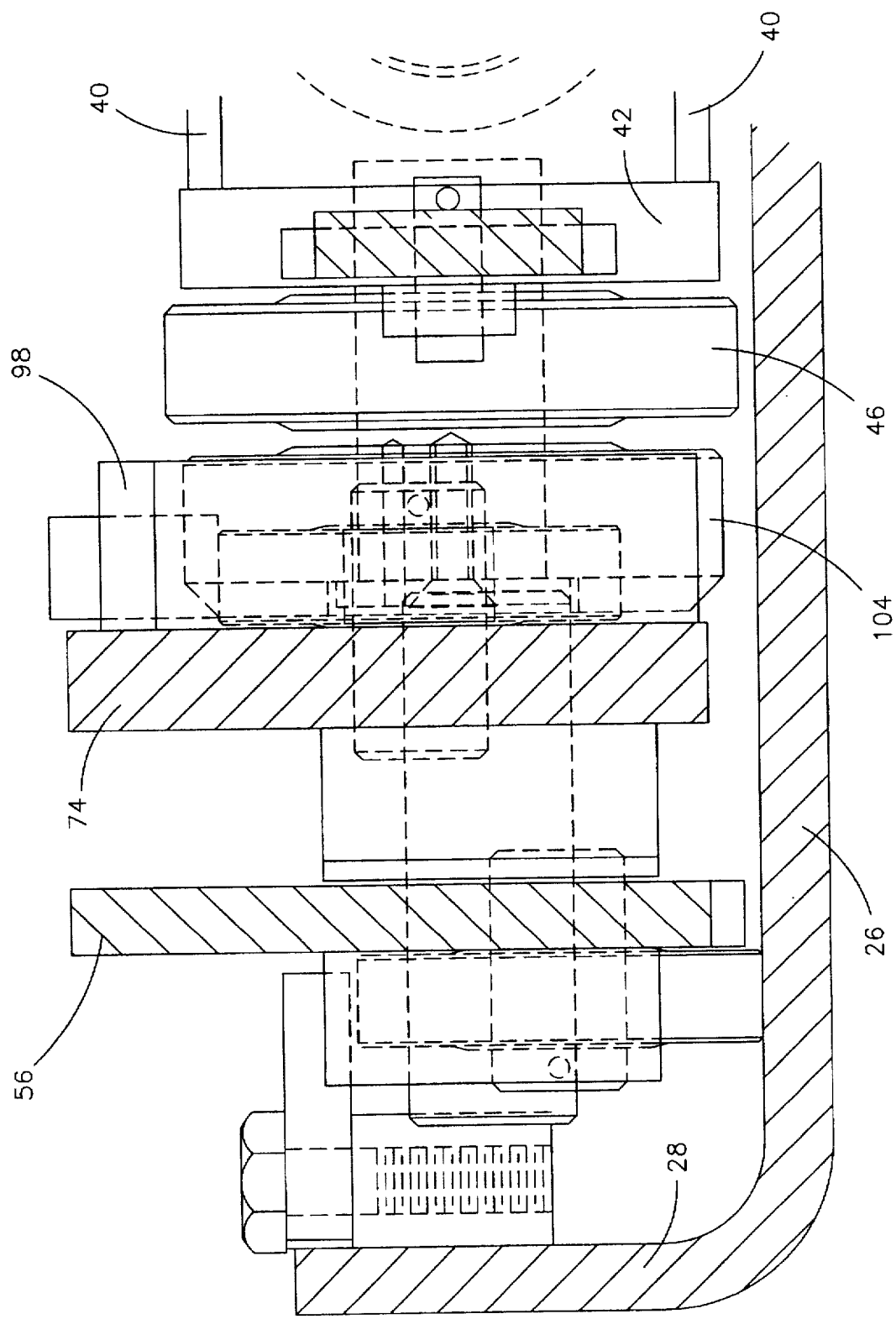
FIG. 11 is an end view on an enlarged scale of a portion of the device shown in FIG. 9.

Each of the legs 74 carries a cam 98 having an arcuate cam face 100 which engages with the peripheral surface 102 of a follower 104. The follower 104 is a roller that is secured to the carriage 44 adjacent the roller 46. As best seen in FIG. 11, the follower 104 is a slightly smaller diameter than the roller 46 and so is free to rotate as the carriage rolls along the base 34. The arcuate face 100 is chosen to modify the motion imparted by the leg 74 to the carriage 44 and compensate for the change in geometry of the leg assemblies 16 as the support moves from an elevated to collapsed position. By appropriate selection of the cam surface 100, a linear vertical spring rate for the lift 10 is provided.

In operation, a load placed on the support 14 causes the legs 74,76 of the assemblies 16 to pivot about the pin 78. The leg 74 rotates about the pin 80, causing the rollers 84,94 to move along their respective tracks. Rotation of the leg 74 also causes the cam surface 100 to engage the outer surface 102 of the follower 104 and cause a longitudinal displacement of the carriage 44. Such displacement is opposed by the action of the spring assemblies 62 which are compressed between the carriage 44 and the bracket 48. The support 14 thus adopts a position in which the vertical loads imposed on the support 14 are balanced by the spring forces of the assemblies 62 acting through the cam 98 on the leg assembly 16.

Figure 6:
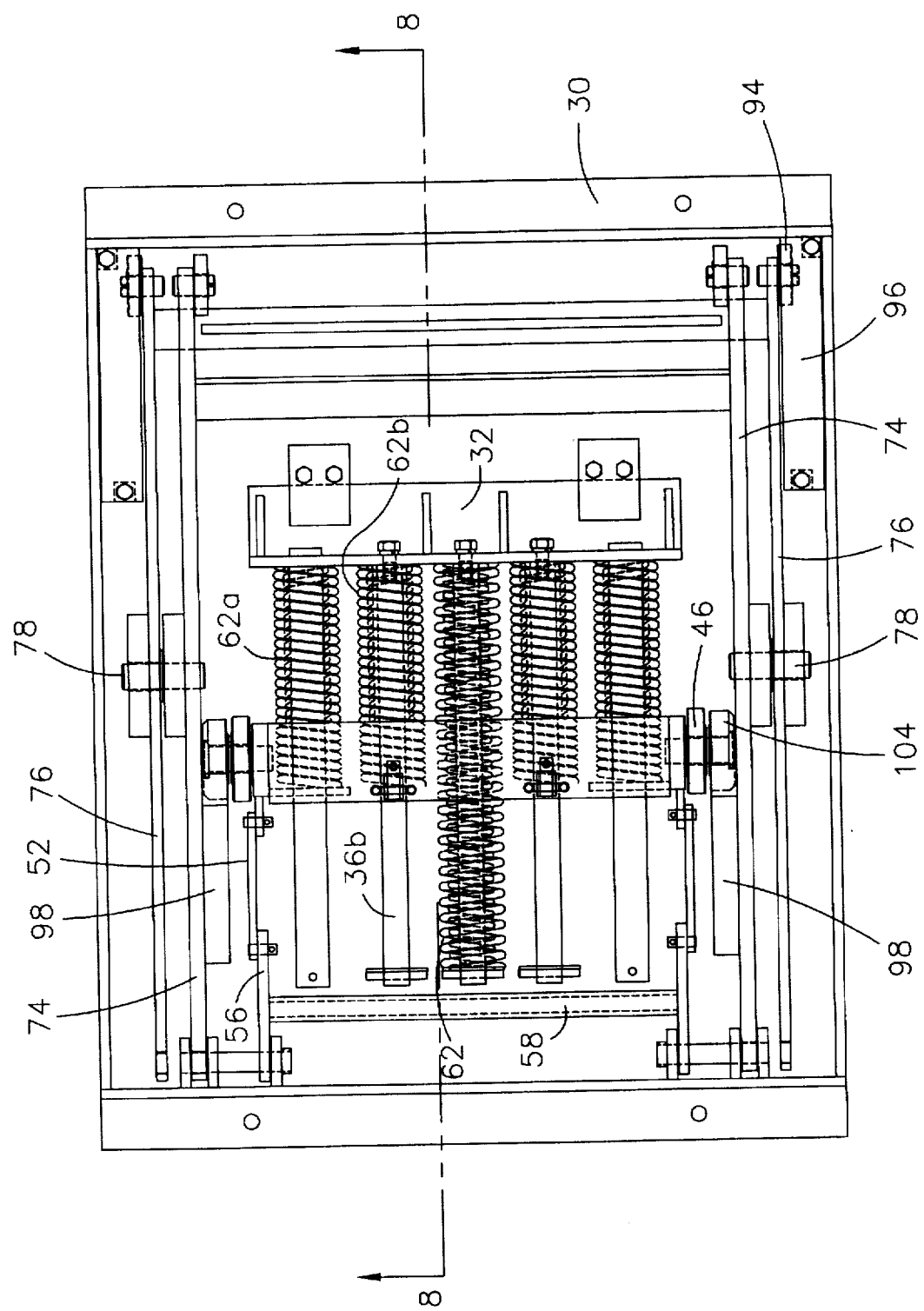
FIG. 6 is a plan view of the device shown in FIG. 4 in a collapsed position.
Figure 7:
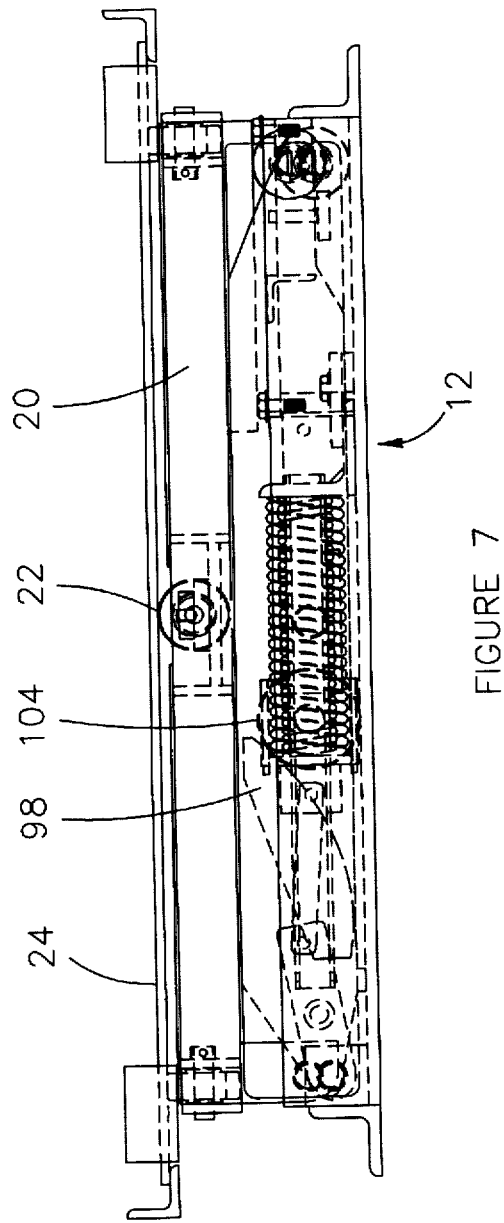
FIG. 7 is a side view with the device in a collapsed condition.
Figure 8:
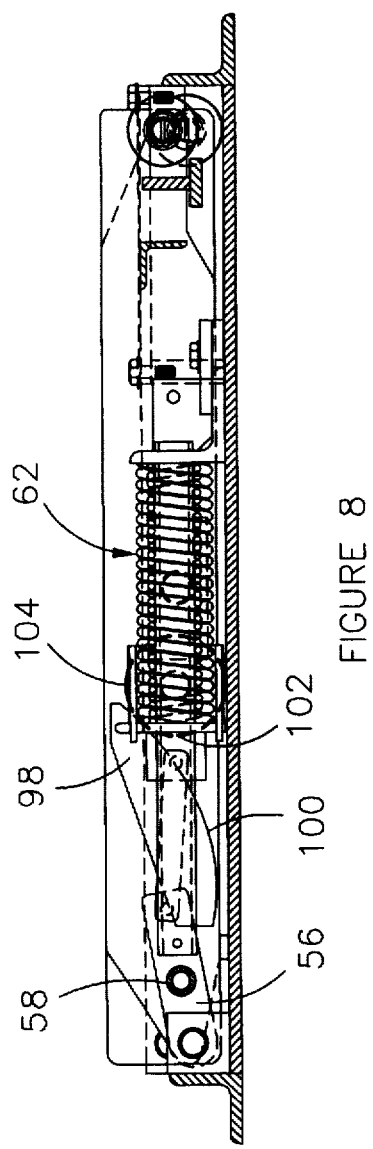
FIG. 8 is a view on the line 8—8 of FIG. 6 similar to FIG. 5 in a collapsed condition.
Figure 9:
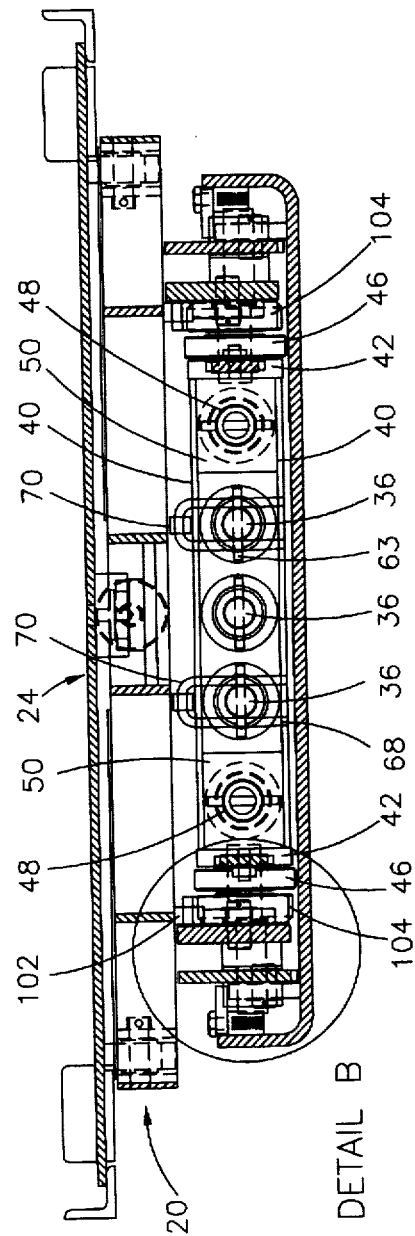
FIG. 9 is an end view of FIG. 7.

The range of loads that can be supported on the lift may be determined by selectively connecting the spring assemblies 62 to the carriage 44. The forks 70 may be engaged or disengaged from the spring assemblies 62 to provide a spring force that corresponds to the max load to be supported. (Thus, for example, if the load consists of layers of boxes of 12" high, with each layer weighing 600 lbs., a spring rate of 600 lbs. per foot will ensure that the layer is generally aligned at a constant horizontal plane as the load is added or subtracted). As shown in FIGS. 6 through 8, as the support 14 moves toward the base 12, the springs 62a,62e associated with rods 36a and 36e are compressed. Forks 70 are also located in the rods 36b, 36d so that they are carried with the carriage 44 and supplement the spring rate. The fork is removed from the rod 36c so that the spring 62 simply passes between the plates 44 and does not contribute to the spring force.

By virtue of the selective engagement of the spring assemblies 62, it is possible to match the spring force with the loads being transferred but at same time it is not necessary to replace components except for the relatively simple forks 70. If it is determined that the spring rate is inappropriate, it is simply necessary to remove the load temporarily and engage or disengage one of the spring assemblies until the appropriate range of spring force is achieved.

The cam 98 acts as a motion modifying mechanism so that the displacement of the carriage 44 relative to the base is opposed by a substantially constant vertical force. In this manner, as the support is loaded or unloaded, the height of the support remains substantially uniform even though the geometry of the legs is changing.

The shape of cam 98 also influences the spring rate by modifying the displacement of carriage 44 for a given displacement or rotation of the leg. Thus a smaller displacement per degree of movement will result in a lower spring rate and vice versa. The selective engagement of the springs 62 together with appropriate shaping of the surface 100 provides the ability to match the spring rate obtained to particular requirements. For example, if a 3,000-lb. pallet having f 6" layers of 660 lbs. each is to be supported on the lift 10, then a 3,000-lb. vertical spring force has to be provided when the support 10 is lowered by 2'5". If each spring 62 provides a 600-lb. load when fully compressed, then the cam 98 must produce a full range of movement of carriage. 44 for 2'6" change of height for the support 14. The profile of surface 100 is then chosen to provide a uniform spring rate of 1,200 lb/ft. over the range of movement of the support 14 by compensating for changes in geometry of the scissor leg assemblies.

If a different pallet (for example, one weighing 1,800 lbs.) is then used, it si simply necessary to disconnect two of the spring assemblies 62 to provide the required support.

It is preferred that the cam 98 is welded to the legs 74 but in some circumstances the cam may be removable, such as with bolts or screws, so that different profiles can be fitted to change the spring rate obtained.

It will also be noted that the spring assemblies are located within the base 12 and do not protrude vertically between the support and base. This avoids the tendency for entrapment of other material during operation of the lift that might be hazardous and more significantly avoids the possibility of a forklift damaging the springs during loading and unloading. Moreover, it will be noted that the load from the support to the base is transferred through the legs with the spring assemblies merely being used to oppose relative movement of the legs and the base.

The spring assemblies 62 are formed from helically wound coil springs that have a coil spacing less than the diameter of the wire used. Accordingly, if one of the springs breaks, it is retained on the rod 32 and only a small movement will occur. The spring assembly will then continue to operate at substantially the same rate as before.

Although it is preferred to use coil springs as the spring assemblies, it will be appreciated that alternative biasing means could be utilized. For example, rubber annulus could be used on the rods 32 to provide a resilience or an air spring substituted for the mechanical springs. As a further alternative, a telescopic hydraulic unit with a gas accumulator to provide resilience could be used.

If preferred, a pair of damper assemblies may be incorporated into the base and parallel to the spring assemblies to oppose oscillation of the support as load is added and removed.

It will be seen, therefore, that a simple yet effective lift mechanism is provided which is versatile and can be readily adopted to meet varying operating conditions.

We claim:

1. A scissor lift to maintain a load at an elevated location comprising a base, a support to support said load, at least one leg assembly having a pair of legs pivoted to one another intermediate their ends, said leg assembly extending between said base and said support and being connected thereto to permit relative movement between said support and said base while maintaining a predetermined orientation of said support to said base, and biasing means acting on said leg assembly to oppose relative movement between said support and said base, said biasing means including a plurality of biasing units selectively engageable with said leg assembly to vary the bias acting thereon.

2. A scissor lift according to claim 1 wherein a carriage is operably connected to said leg assembly for movement therewith and said units are selectively engageable with said carriage.

3. A scissor lift according to claim 2 wherein said carriage is supported upon said base and is moveable relative thereto.

4. A scissor lift according to claim 3 wherein said biasing units are mounted on said base.

5. A scissor lift according to claim 4 wherein said biasing units include mechanical spring elements.

6. A scissor lift according to claim 5 wherein said mechanical spring elements are selectively connected to said carriage by removable pins.

7. A scissor lift according to claim 4 wherein said carriage is supported on rollers for movement relative to said base and said biasing units act between said carriage and an abutment on said base.

8. A scissor lift according to claim 7 wherein said leg is pivotally connected to said base and a cam member is provided on said leg to engage a follower on said carriage and cause relative movement thereof upon pivotal movement between said leg and said base.

9. A scissor lift according to claim 8 wherein said follower is rotatably mounted on said carriage adjacent said roller.

10. A scissor lift according to claim 7 wherein said biasing units include coil springs.

11. A scissor lift according to claim 10 wherein said coil springs are supported on rods secured to said abutment and passing through said carriage.

12. A scissor lift according to claim 10 wherein said coil springs may pass between spaced components on said carriage and removable pins act between said components and respective ones of said springs to interconnect said spring and carriage.

13. A scissor lift according to claim 12 wherein said coil springs are supported on rods secured to said abutment and passing through said carriage and said pins pass to either side of said rods to engage said coil springs.

14. A scissor lift to maintain a load at an elevated location comprising a base, a support to support said load, at least one leg assembly having a pair of legs pivoted to one another intermediate their ends, said leg assembly extending between said base and said support and being connected thereto to permit relative movement between said support and said base while maintaining a predetermined orientation of said support to said base, biasing means acting on said leg assembly to oppose relative movement between said support and said base and load transfer means acting between one end of one of said legs and said biasing means to transmit displacement of one of said legs to said biasing means.

15. A scissor lift according to claim 14 wherein said load transfer means acts upon a carriage moveable relative to said base and said biasing means act between an abutment on said base and said carriage.

16. A scissor lift according to claim 15 wherein said biasing means includes longitudinally compressible elements to oppose relative movement between said carriage and said base.

17. A scissor lift according to claim 16 wherein said elements are coil springs.

18. A scissor lift according to claim 17 wherein said coil springs are supported on rods extending from said abutment surface.

19. A scissor lift according to claim 18 wherein said coil springs are selectively engageable with said carriage.

20. A scissor lift according to claim 15 wherein said biasing means are selectively engageable with said carriage.

21. A scissor lift to maintain a load at an elevated location comprising a base, a support to support said load, at least one leg assembly having a pair of legs pivoted to one another intermediate their ends, said leg assembly extending between said base and said support and being connected thereto to permit relative movement between said support and said base while maintaining a predetermined orientation of said support to said base, and biasing means acting on said leg assembly to oppose relative movement between said support and said base, said biasing means being connected to said leg assembly by a load transfer means to transmit displacement of one of said legs to said biasing means, said load transfer means including a motion modifying mechanism to modify the effect of such displacement on said biasing means.

22. A scissor lift according to claim 21 wherein said motion modifying means includes a cam member and a follower.

23. A scissor lift according to claim 22 wherein said biasing means acts upon said leg by a carriage displaceable relative to said base and said follower is mounted on said carriage and said cam is secured to said leg.

24. A scissor lift according to claim 23 wherein said biasing means includes coil springs acting between an abutment on said base and said carriage.

25. A scissor lift according to claim 24 wherein said coil springs are disposed normal to the direction of relative movement between said support and said base.

26. A scissor lift according to claim 23 wherein opposite ends of said carriage are interconnected by a linkage secured to said base to maintain alignment of said carriage during relative movement between said base and carriage.

27. A scissor lift according to claim 26 wherein said linkage includes a bar rotatably secured to said base for movement about an axis normal to displacement of said carriage and a pair of links spaced apart along said bar and extending between said carriage and arms connected to said bar whereby relative movement between opposite ends of said carriage induces a torsional load in said bar to maintain alignment of said carriage.

28. A scissor lift according to claim 23 wherein said cam member is permanently secured to said leg.

29. A scissor lift according to claim 23 wherein said cam member is selectively removable from said leg.

\* \* \* \* \*